United States Patent
Nacman et al.

(10) Patent No.: US 6,563,963 B1
(45) Date of Patent: May 13, 2003

(54) HIGH QUALITY DIGITAL SCALING USING IMAGE TAGS

(75) Inventors: Aron Nacman, Penfield, NY (US); Ramesh Nagarajan, Fairport, NY (US); William A. Cook, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 106 days.

(21) Appl. No.: 09/718,707

(22) Filed: Nov. 22, 2000

Related U.S. Application Data

(62) Division of application No. 09/159,042, filed on Sep. 23, 1998, now Pat. No. 6,216,465.

(51) Int. Cl.$^7$ ................................................. G06K 9/36
(52) U.S. Cl. ...................................... 382/298; 358/451
(58) Field of Search ................................ 382/298–301; 358/449–464

(56) References Cited

U.S. PATENT DOCUMENTS

| | | | |
|---|---|---|---|
| 5,008,752 A | | 4/1991 | Van Nostrand |
| 5,237,432 A | | 8/1993 | Calarco et al. |
| 5,335,295 A | * | 8/1994 | Ferracini et al. ............. 358/451 |
| 5,355,447 A | | 10/1994 | Knowlton .................... 345/439 |
| 5,400,154 A | * | 3/1995 | Takayama et al. .......... 358/451 |
| 5,402,513 A | * | 3/1995 | Schafer ....................... 358/451 |
| 5,469,223 A | | 11/1995 | Kimura ....................... 348/581 |
| 5,661,824 A | | 8/1997 | Allebach et al. ............ 348/581 |
| 5,742,703 A | * | 4/1998 | Lin et al. |
| 5,790,714 A | * | 8/1998 | McNeil et al. .............. 382/300 |

* cited by examiner

Primary Examiner—Jingge Wu
(74) Attorney, Agent, or Firm—Fay, Sharpe, Fagan, Minnich & McKee, LLP

(57) ABSTRACT

A system and method for selective scaling of an image by selective implementation of a window averaging processing technique or an interpolation processing technique. For enlargement scaling, the interpolation processor is implemented. For reduction scaling, the window averaging processor is implemented. For anamorphic scaling, the window averaging processor may be selected and implemented for reduction processing pursuant to a two-pass processing technique wherein the interpolator processing will be implemented thereafter.

Image tags are provided for selective scaling of each area of an image according to the type of content of each area by selective implementation of a window averaging processing technique or an interpolation processing technique. The interpolation processor is implemented for line drawing areas of an image, and the window averaging processor is implemented for contone areas of the image. For anamorphic scaling with image tags, a two-pass system is provided which performs a first-pass reduction in one direction followed by a second-pass enlargement in the remaining direction, wherein the reduction is performed in the manner described for reduction scaling. A one-pass system is also provided which provides a second serially connected interpolator so that the aforementioned reduction can be performed on one dimension in a first step, followed by enlargement in the remaining direction in a following step on the same pass.

7 Claims, 5 Drawing Sheets

HIGH QUALITY DIGITAL SCALING USING IMAGE TAGS

This is a continuation-in-part application of U.S. application Ser. No. 09/159,042 filed on Sep. 23, 1998, now U.S. Pat. No. 6,216,465.

BACKGROUND OF THE INVENTION

1. Field of the Invention

The invention pertains to the art of image processing and a digital signal processing method and apparatus therefor and, more particularly, to an apparatus for scaling, i.e., enlarging or reducing, an image.

2. Description of Related Art

In digital image processing, the ability to electronically magnify or reduce an image is almost uniformly required as a feature of conventional imaging devices such as copiers and printers. Selected scaling of the image can be limited to a few predetermined choices, but present market tendencies are to demand virtually unlimited scaling options, particularly in the higher quality copying machines. The hardware circuits that have been designed to implement such scaling have been required to capture and process the pertinent image signals with reduced processing time and with minimal storage requirements, for improved operating efficiency and minimization of hardware costs.

The present digital scaling system is directed to a method and control circuit for implementation thereof for selected enlargement, reduction and anamorphic scaling of an image. For the subject disclosure, "anamorphic" is intended to mean the ability to scale so that the images are enlarged in one dimension and reduced in another dimension; and can also include enlargement or reduction in one dimension with no scaling in the other dimension.

The description includes references to slow-scan and fast-scan digital image data when discussing the orientation of selected window coordinates and sampled image data signals used by control circuitry. For purposes of clarification, data collected along a fast scan direction is intended to refer to individual pixels located in succession along a raster of image information. On the other hand, data collected in the slow-scan direction refers to data derived from a common raster position across multiple rasters of image information. As an example, fast-scan data would refer to the sequential signals collected along the length of the linear photosensitive array during a single exposure period, and is commonly referred to as a raster of data. Slow-scan data would be used to describe signals captured from a plurality of elements along a linear photosensitive array, as the array was moved relative to a document. Analogously, your eyes move in the fast-scan direction relative to this page as you read along each line; when your eyes move to the next line down, they have moved in the slow-scan direction.

Various scaling techniques are known for manipulating static images which are later output onto such media as the screen of a personal computer or onto printed paper. Practically all techniques calculate the value of a new pixel based on the values of neighboring original pixels. For example, linear interpolation uses a matrix of adjacent pixels where the nearest neighbors in the slow scan and fast scan direction define the matrix employed in the calculation of the new pixel value.

A known problem with regard to prior interpolation scaling systems is, particularly with regard to reduction, that such systems operate in a manner to cause an undesired loss of data. Simply stated, linear interpolation throws away data by discarding the values of intermediate original pixels during the calculation of values for the pixels of the reduced image. The loss of such data is a problem sought to be overcome by higher quality imaging systems.

The present invention contemplates a new and more efficient scaling process, which overcomes the above-referenced problem and others to combine a new pixel window averaging process for reduction scaling, in conjunction with linear interpolation for enlargement scaling, to obtain a higher image quality processing system for a digital scaling system.

BRIEF SUMMARY OF THE INVENTION

In accordance with the present invention, there is provided a method and apparatus for selectively enlarging or reducing an image in a plurality of dimensions. The image is scaled in the first dimension by a first scaling process and is scaled in the second dimension by a second scaling process. If the first scaling process comprises an enlargement of the image, the process is an interpolating process, while if the second scaling process is a reduction of the image, the process comprises a pixel window averaging process. The scaling factor of either the enlargement or the reduction is selectively variable for either dimension. Thus, the invention provides a unique advantage of permitting an operator to select different scaling techniques to facilitate the implementation of the best technique for the desired result.

In accordance with another aspect of the present invention, implementation of the distinct scaling processes is achieved in parallel where either the interpolation process or the pixel window averaging process are active for the scaling of the image. Scan line buffers for storage of image scan lines can be shared but only one of the scaling techniques can be implemented at a time.

In accordance with another alternative embodiment of the invention, the distinct scaling process can be serially implemented for concurrent active scaling operations for the image. In such a serial approach, separate scan line buffers for interpolation and pixel window averaging are respectively required. The separate scan line buffers can be used simultaneously to implement the concurrent scaling operations. In accordance with still another alternative embodiment of the present invention, there is provided a method and apparatus for selectively enlarging or reducing an image in a plurality of dimensions, wherein the reducing process is selected according to an image tag associated with each pixel of the image which defines the type of image content in the area encompassing the pixel. The image is scaled in the first dimension by a first scaling process and the image is scaled in the second dimension by a second scaling process. If the first scaling process comprises an enlargement of the image, the process is an interpolating process, while if the second scaling process is a reduction of the image, the process comprises an interpolating process when the associated image tag defines a line drawing image content or a pixel window averaging process when contone image content is defined by the image tag.

In accordance with yet another aspect of the present invention with respect to anamorphic scaling, implementation of the distinct scaling processes is achieved in parallel, in a two-pass process, where either the interpolation process or the pixel window averaging process output is selected for reducing of the image on a first pass in one direction. Scan line buffers for storage of image scan lines are provided in each parallel path. On a second pass in the remaining direction, only the interpolator process is implemented in order to enlarge the image in the remaining direction.

In accordance with still another alternative embodiment of the invention, a second interpolator enlarging process is implemented, serially connected to the output of a first reducing process comprised of a pixel window averaging process and an interpolator process connected in parallel as described in the previous embodiment. The first reducing process is implemented in the manner described above for reducing of the image wherein a multiplexer selects the preferred process output. In this manner this alternative embodiment provides one-pass anamorphic scaling.

One benefit obtained from the present invention is a scaling system which provides overall higher quality imaging in a digital scaling system by providing a selective scaling processes including a more efficient system for image reduction either in combination with, or alternative to, a linear interpolation scaling process.

Another benefit obtained from the present invention is selective implementation of either a serial or parallel approach for the implementation of a scaling system having both an interpolation technique particularly useful for enlargement of an image, and a pixel window averaging technique for reduction of the image. In the parallel approach sharing of scan line buffers provides for reduced hardware costs, while in the serial approach, simultaneous interpolating processing and pixel window averaging processing minimizes processing time.

Still another benefit obtained from the present invention is the unique advantage of using a preferred scaling technique in each area of an image, facilitating the implementation of the best technique for the desired result.

Yet another benefit obtained from the present invention is the advantage of one-pass anamorphic scaling incorporating a preferred scaling technique in each area of an image.

Other benefits and advantages of the subject method and apparatus will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings hereof and wherein.

DETAILED DESCRIPTION OF THE INVENTION

Two-dimensional interpolation is a known technique for digital scaling systems and can be successfully implemented for enlargement, reduction, and anamorphic scaling. Interpolation techniques intended to be implemented in accordance with the present invention are disclosed in commonly assigned U.S. Pat. No. 5,237,432 to Calarco et al. and U.S. Pat. No. 5,579,418 to Williams et al., both of which are herein incorporated by reference. The interpolation techniques disclosed therein comprise bi-linear interpolation between neighboring pixels. For purposes of brevity, no further description is deemed necessary for disclosing the preferred embodiments of the present invention and wherever such interpolation techniques are to be practiced in accordance with the subject invention they will merely be referred to herein as 'interpolation', and should be appreciated to comprise the embodiments disclosed in these patents.

The pixel window averaging technique referenced herein is particularly useful for reduction scaling, as it avoids the discarding of data information that can occur in an interpolation technique. The preferred embodiment for implementing the window averaging technique referenced herein, is disclosed in a U.S. application Ser. No. 09/159,533, being filed simultaneously with this application, which is also incorporated by reference herein. Pursuant to this technique, the number of pixels to be averaged within a selected window is dependent upon the operator's scaling factor and will accordingly vary therewith so that an output pixel representative of the average intensities of the pixels within the window will have a calculated relationship to all of the pixels in the window, thus maximizing the consequential relationship between the original pixel data and the averaged output. Again, for purposes of brevity, the detailed steps and apparatus for implementing the preferred window averaging process that comprise a part of the subject invention are not repeated herein. However, it is our intention that the references to window averaging in the present application shall comprise the detailed descriptions contained in the referenced co-pending application.

The subject invention is directed to a system where both interpolation and window averaging scaling techniques can be implemented for improving image quality in a digital scaling system.

As noted above, prior techniques used exclusively interpolation for enlarging, reducing or anamorphic scaling. The subject invention intends that interpolation will continued to be used for enlargement, but that pixel window averaging will be alternatively used as part of the scaling system for image reduction, or for reduction processing during anamorphic scaling.

Figure 1:
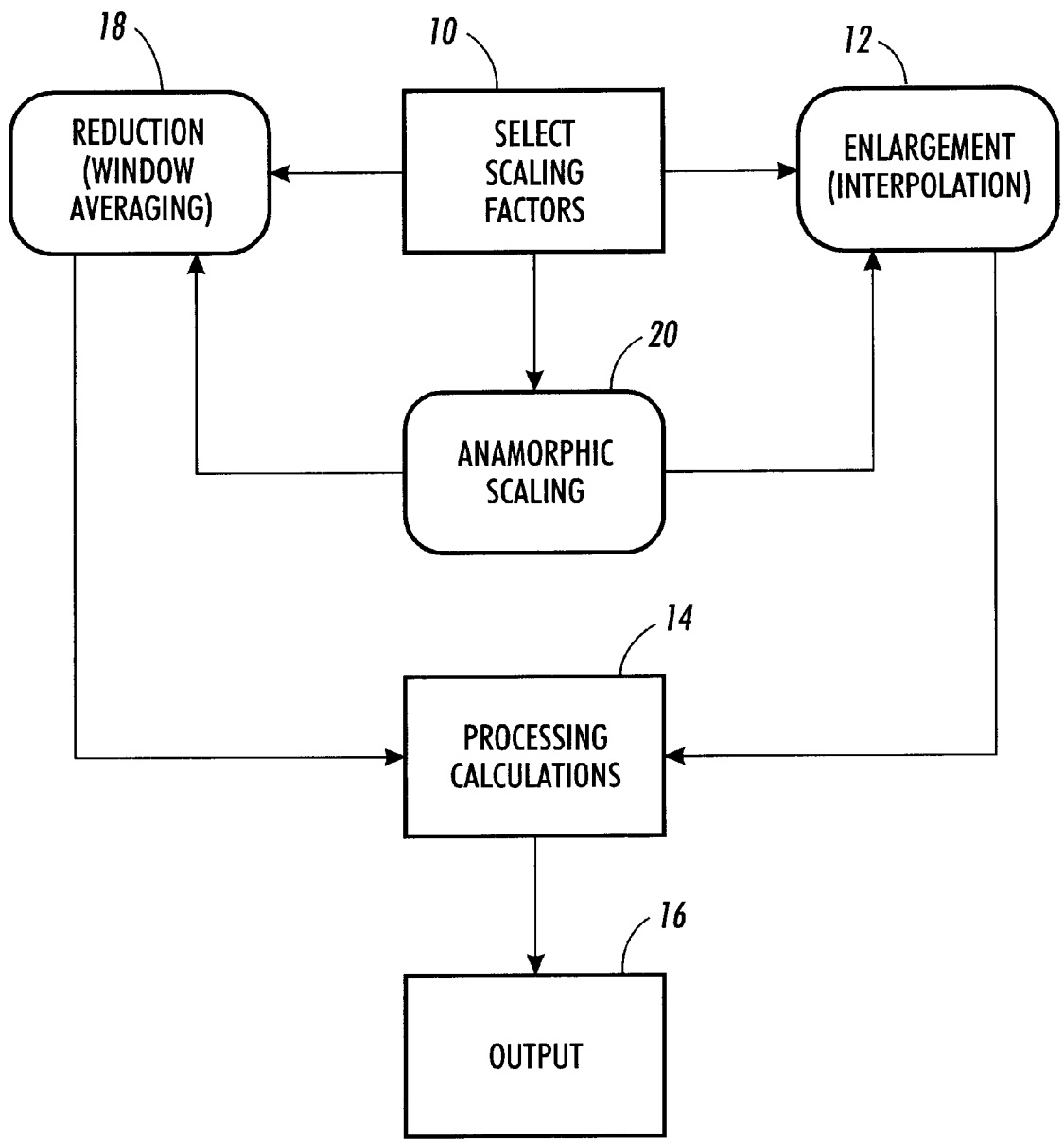
FIG. 1 is a flow-chart of the method of the present invention.

With reference to FIG. 1, the selective relationship between the distinct scaling techniques is illustrated in a manner that can be practiced by an operator.

Given an input image signal comprising a video or some other form of imaging data (not shown), an operator can select 10 scaling factors for outputting an enlarged or reduced or anamorphically varied image form of the input image. If operator selection is for enlargement, the subject system will proceed with interpolation 12 and the appropriate mathematical calculations 14 are completed so that an output data signal 16 is generated that is representative of the enlarged image. Alternatively, if the operator intends that the original image should be scaled for reduction 18, pixel window averaging system processing will process the input data for reducing the image. The appropriate calculation will be completed at 14 and a reduced output signal 16 is thus generated. With reference to an anamorphic scaling 20 where an operator can select enlargement in a first dimension, and reduction in a second dimension, the subject invention intends interpolation 12 for all the input data in both the first and second dimensions in a one-pass system. However, alternatively a two-pass system (discussed below) could interpolate and window average in different dimensions. It is an advantageous feature that in digital scaling systems wherein the scaling operations primarily involve data calculation steps, such anamorphic scaling involving two different scaling processes can be imposed on the same original input data.

Figure 2:
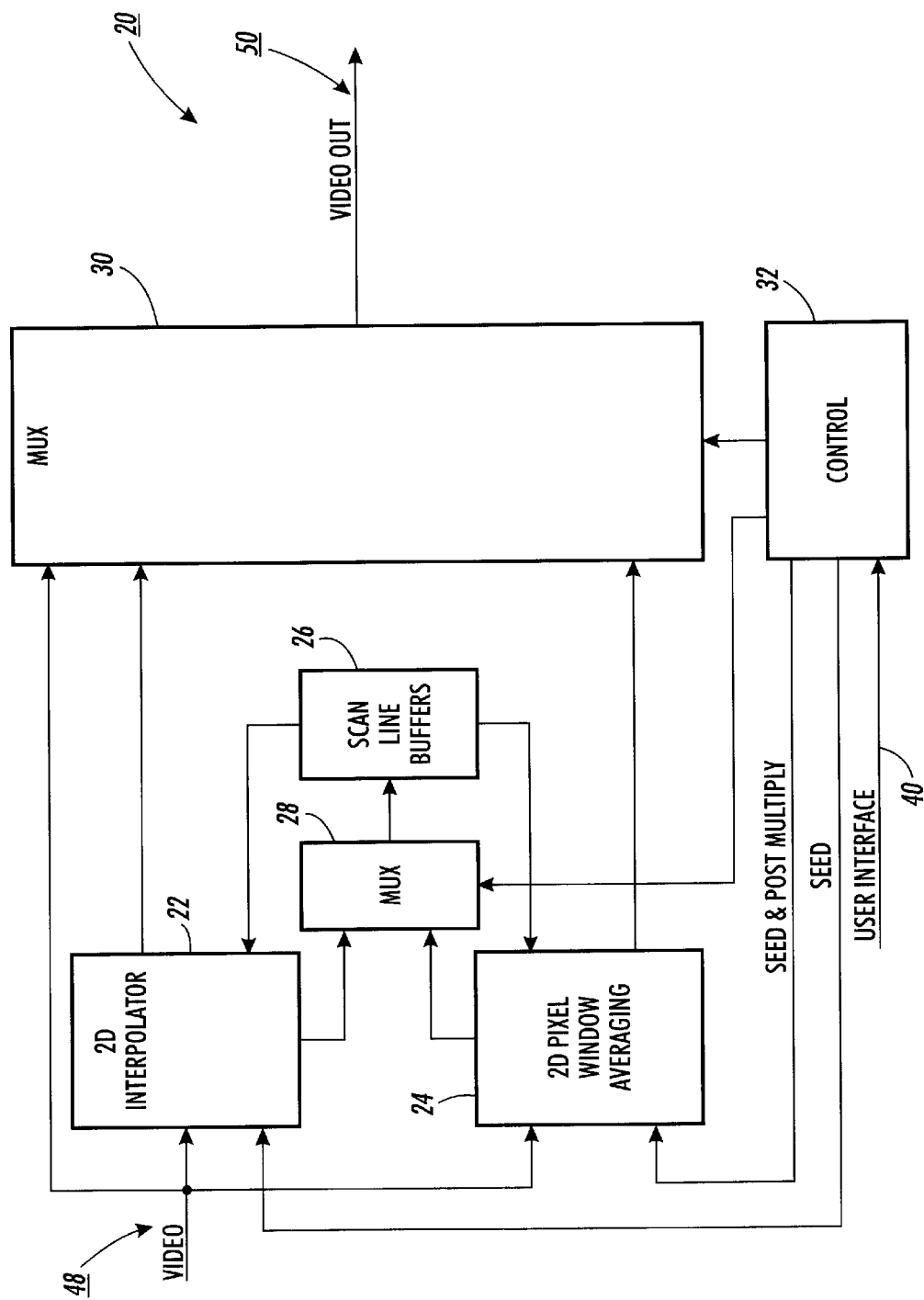
FIG. 2 is a control circuit configured to show a parallel approach to implementation of interpolation and window averaging scaling processes.
Figure 3:
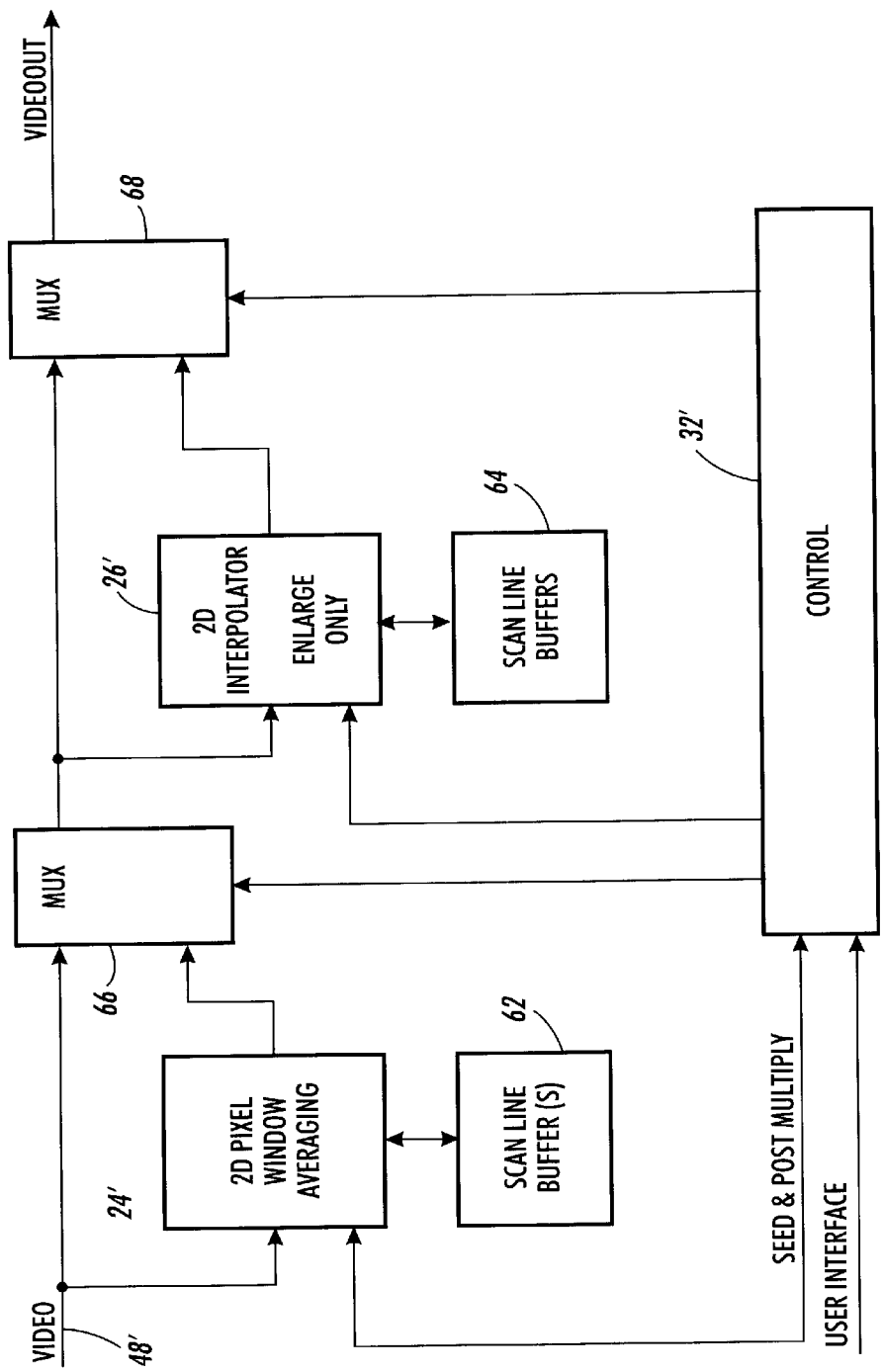
FIG. 3 is a control circuit of a serial approach for implementing interpolation and window averaging scaling techniques.

With reference to FIGS. 2 and 3, as noted above, pixel window averaging is generally preferred for reduction because window averaging does not lose information from the original input data to the extent that interpolation does. The subject invention involves combining such advantageous window averaging scaling techniques with an interpolation technique for avoiding interpolation losses when window averaging can be implemented during the scaling operations. For purposes of this illustration only, the video input for both the systems of FIGS. 2 and 3 is 8 bits per pixel. Other data sizes are, of course, possible, depending on desired resolution.

With particular reference to FIG. 2, a system 20 for implementing interpolation and pixel window averaging in parallel is shown comprised of a interpolator processor 22, a window averaging processor 24, scan line buffers 26, first and second multiplexers 28, 30 and an input control 32. The system 20 is intended to allow interpolation and window averaging in parallel so that the scan line buffers 26 can be shared to reduce hardware costs. (Although both the systems shown in FIGS. 2 and 3 are illustrated as comprising hardware circuits, it is also possible to implement principal components of the subject invention through software techniques in more general purpose processors.)

Assuming a fast scan image length of 12 inches at 600 SPI, scan line buffers 26 would normally be comprised for interpolation requirements of two 8×7200 FIFOs, while the window averaging processor would require one 12×7200 FIFO. Sharing of the FIFOs can provide an appreciable decrease in required memory size. For example, if the FIFOs were external, then the cost savings would be the cost of two 8×8 K 50 MHZ or one 16×8 K 50 MHZ FIFO. A sharing of the FIFOs eliminates the need for the 12×7200 FIFO and associated logic circuitry.

In the preferred embodiments, the scan line buffers 26 comprise a RAM. However, for practical purposes, the buffers are merely a storage for implementing a signal delay to allow accumulation of intermediate sums during the scaling calculations. The subject scan line buffers can be varied in size depending upon the desired resolution of the imaging system involved, but the principal advantage to be conveyed here, i.e., reduced hardware costs, should be appreciated.

With continued reference to FIG. 2, the operation of the system 20 is such that an operator will input the desired scaling from a user interface signal line 40. The control block 32, which can be either software or hardware, calculates the proper seed factors, post multiply and multiplexer settings to achieve the desired output and communicates these data items to the interpolator processor 22 and window averaging processor 24 as needed. The input video signals 48 are thus selectively processed by the interpolator processor 22 for enlargement, or the window averaging processor 24 for reduction, or alternatively, could be directly multiplexed out through multiplexer 30 if no scaling is desired. If only reduction is desired, then the original video signal 48 is processed by the window averaging processor 24 utilizing the scan line buffers 26 in accordance with the control switching by the multiplexer 28 until completion of the calculation process and then is multiplexed out through multiplexer 30 as a video signal 50. More specifically, for reduction, the proper seed, post multiply and multiplexer configurations are set by the control block 32 to implement the pixel window averaging techniques. If only an enlargement is desired, then the proper seed and multiplexer configurations are set by control block 32 to activate the interpolator processor 22 for operating on the video input signal 48. If an anamorphic scaling were desired, then two solutions are possible for processing calculations. For single pass productivity, the interpolator 22 is used for all anamorphic scaling, i.e., both enlargement and reduction. For two-pass productivity, but increased image quality, pixel window averaging can be implemented on the first pass to generate an intermediate signal and the interpolator 24 is used on the intermediate signal on the second pass. More particularly, on the first pass, the system would process the video input signal 48 through the pixel window averaging processor 24 in one direction only (fast or slow scan) and the other direction would be set at 100 percent scaling. The resulting reduced image would be stored in memory (not shown) and the resulting image would be retrieved from the memory and could be looped back through the system set up to do interpolation processing in the other direction (fast or slow).

With reference to FIG. 3, distinct scan line buffers 62 and 64 are each individually associated respectively with the window averaging processor 24' and the interpolator process 22'. FIG. 3 is referenced as a serial processing approach since the processors 22' and 24' are in series electrical communication. An important advantageous feature for such a system construction is that the processors 22' and 24' can operate concurrently so that interpolation processing and window averaging processing can occur essentially simultaneously. Similar to the system of FIG. 2, the control block 32' would calculate the proper seed factor, post multiply and multiplexer settings to get the desired outputs and switching control is achieved through multiplexers 66, 68. In the system of FIG. 3, the video input signal 48' can be selectively communicated to the window averaging processor 22' or the multiplexer 66. When communicated to the multiplexer 66, the window averaging processor is bypassed and the video output signal can be multiplexed out through multiplexer 68 while bypassing the interpolator processor 24' when no scaling is desired. However, if enlargement is desired for the input signal, then the interpolator processor 24' will process the video input signal pursuant to the techniques referenced above and the resultant output can be communicated as a new output signal from multiplexer 68. The system of FIG. 3 is also able to implement anamorphic scaling where desired by implementing pixel window averaging in one direction only (fast or slow scan) and interpolation in the other direction (fast or slow scan) after the intermediate output from the averaging process is retrieved from a memory in a manner as described above.

It is an important feature of the subject invention, as embodied in either FIGS. 2 and 3, that either system includes both an interpolator processor 22, 22' and a window averaging processor 24, 24' for selective scaling of video input data by either or both of the respective processors. Such a system provides for higher quality image output by avoiding limiting of the processing of the input data to only interpolation processing for reduction scaling as in prior systems. Rather, reduction scaling can be implemented by an improved window averaging processing technique for improved reduction in scaling, in combination with interpolation techniques for enlargement scaling. Thus, the unique structural configuration of allowing window averaging processing for reduction scaling in parallel or serial operation with interpolation processing for enlargement scaling provides expanded operator selection and control not available in prior systems.

Of the two types of digital scaling techniques included in the aforementioned embodiments, linear interpolation and pixel window averaging, each technique has advantages for specific types of images. In general, linear interpolation works best on line art while pixel averaging works best on contone images, and linear interpolation works for both reduction and enlargement while pixel averaging works on reduction only. For these reasons, additional systems are provided that make use of image tags so that the image can be divided into areas according to the type of image content in each area, thereby making it possible to use the preferred scaling method for each area of the image according to its content. Image tags are digital values that categorize areas of the image into types. Each image pixel can have a tag value that associates an image type with that pixel. Using image tags to select the best scaling method for each image pixel will provide high quality scaling. The first system to be described utilizing image tags can do one pass enlargement or reduction and two pass anamorphic scaling. A second system described later can do one pass enlargement or reduction or anamorphic scaling.

Figure 4:
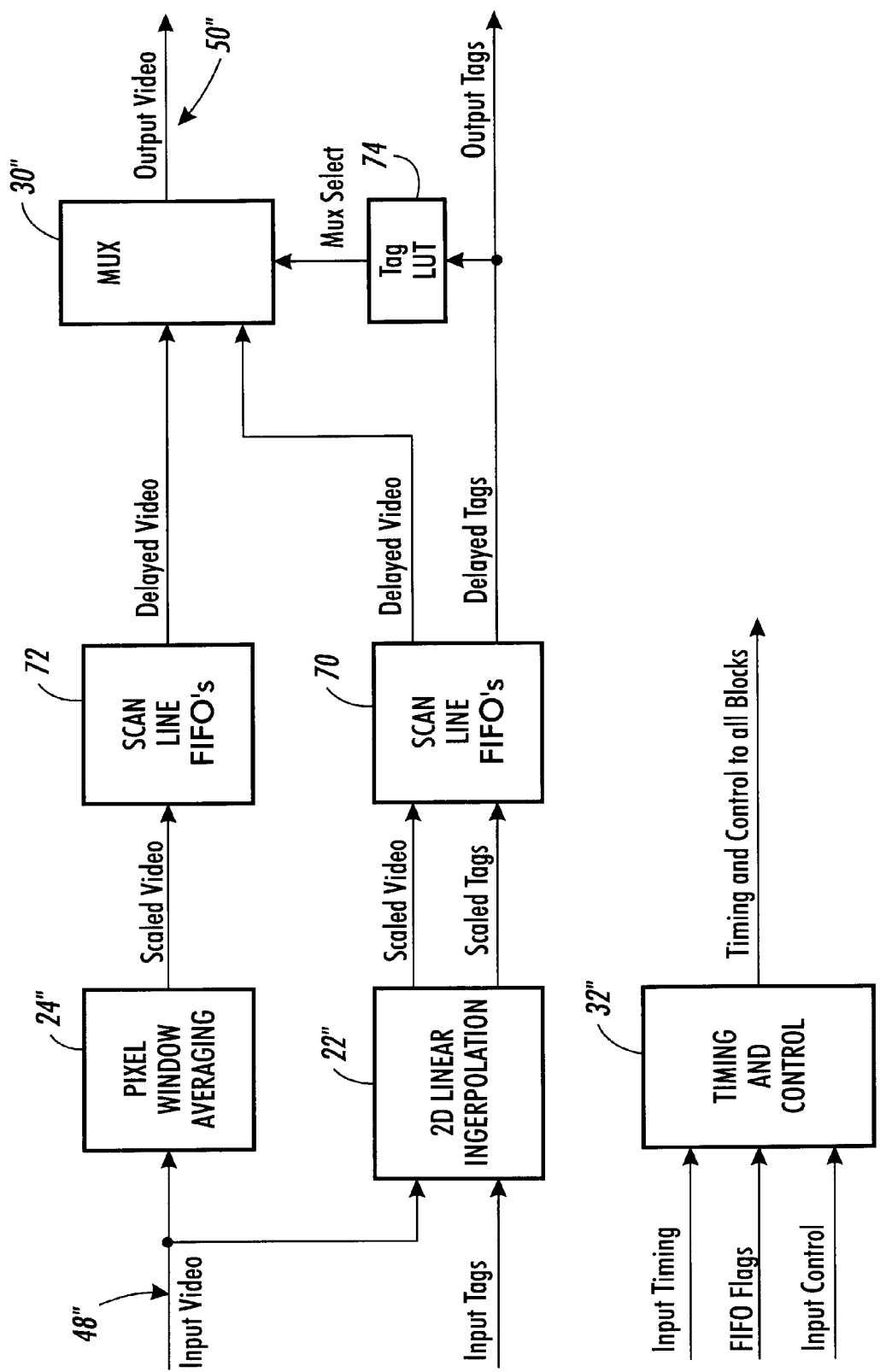
FIG. 4 is a control circuit configured to show implementation of image tags providing for selection of preferred reduction processes according to image content.

In the first system utilizing image tags as shown in FIG. 4, single pass enlargement or reduction and two pass anamorphic scaling is supported. The pixel window averaging circuit 24" and the linear interpolator 22" are in parallel. Each work on the same input video 48" simultaneously. In the case where enlargement has been selected, only the interpolator 22" video output is used and is selected by timing/control block 32". Because the window averaging 24" and the interpolation 22" do not have the same output pipeline timing, one raster line of video output from each is stored in a FIFO buffer. The video output from interpolation 22" is stored in FIFO 70, and the video output from window averaging 24" is stored in FIFO 72. This includes the aforementioned image tags as well.

The input image tags can describe a number of image types. In a typical system there would be 5 tag bits describing up to 32 image types. Because there are only 2 types of reduction to choose from in this system, the tags must be translated into a single multiplexer selector bit. A tag look up table 74 (LUT) translates the scaled tags into a selector bit where, for example, a value of 0 represents line art and a value of 1 represents a contone image. The tags from interpolation 22" are used for input to LUT 74 because the interpolation can do reduction and enlargement while the window averaging can do only reduction. The method of scaling tags is the same for interpolation and window averaging. For reduction, tags are deleted, and for enlargement, tags are replicated. When timing and control block 32" determines that there is enough video in FIFO 70 and FIFO 72, the video and tags are read by multiplexer 30". The selector bit is used by multiplexer 30" to select the proper input video value for each pixel of output. For anamorphic scaling, two passes are required. On the first pass, only reduction is done in the required X or Y direction. On the second pass, enlargement is done with the interpolator in the remaining direction.

Figure 5:
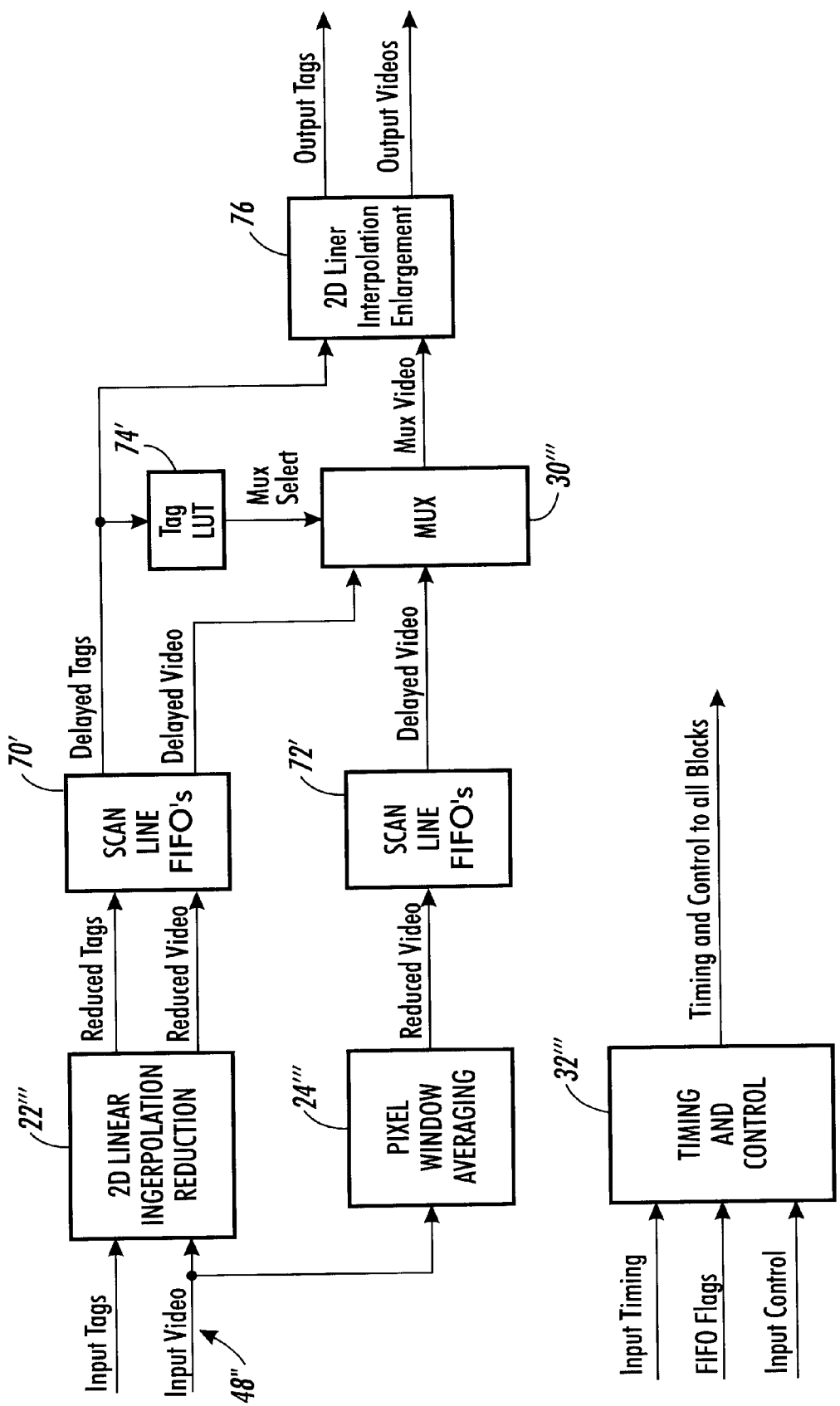
FIG. 5 is a control circuit similar to FIG. 4 implementing an additional interpolation process for one-pass anamorphic scaling.

In a second system utilizing image tags as shown in FIG. 5, one pass enlargement or reduction or anamorphic scaling is supported. The system is similar to the system of FIG. 4 except that an enlargement interpolator 76 has been added to the output of the video/tag multiplexer 30''', and the front end interpolator 22''' is used for reduction only. In this system, the correct reduction is selected by multiplexer 30''', and output interpolator 76 provides any required enlargement. For example, in the case where a user has selected enlargement, interpolator 22''' passes the input image tags and input video to FIFO 70' unaltered. Multiplexer 30''' then selects the unaltered video and forwards it to interpolator 76 which performs the required enlargement process and image tag replication.

In the case where a user has selected reduction, input video pixels are received simultaneously by interpolator 22''' and window averaging component 24'''. For each pixel of input video, a corresponding image tag is received by interpolator 22'''. Interpolator 22''' performs the required video reduction and image tag deletion process, and FIFO 70' receives the reduced image tags and video. Essentially simultaneously, window averaging component 24''' also performs the required video reduction, and FIFO 72' receives the reduced video.

When a full raster line has been received by FIFO 70' and FIFO 72', multiplexer 30''' receives both delayed videos from FIFOs 70' and 72', and image tag LUT 74' receives corresponding image tags from FIFO 70'. LUT 74' translates each image tag into a multiplexer select bit which is received by multiplexer 30'''. Multiplexer 30''', selects the appropriate input video according to the value of the multiplexer select bit, and interpolator 76 receives the selected video from multiplexer 30''' and corresponding image tags from FIFO 70'. Interpolator 76, being used only for enlargement, performs no further operations on the video and image tags except to pass them unaltered to output 50'''.

In the case where a user has selected anamorphic scaling, a reduction process is performed along one axis (X or Y) in the manner just described. However, when interpolator 76 receives the reduced video and image tags, an appropriate enlargement process is performed to produce a correctly scaled output 50'''. Alternately, an enlargement process could be performed first, and a reduction process could be performed last.

The invention has been described with reference to the preferred embodiments. Potential modifications and alterations will occur to others upon a reading and understanding of the specification. It is our intention to include all such modifications and alterations insofar as they come within the scope of the appended claims, or the equivalents thereof.

Having thus described our invention, we now claim:

1. A method for scaling an image signal representing an image with an interpolator processor and a pixel window averaging processor, and selecting an output from said processors based upon a user instruction to enlarge or reduce the image and based upon an image tag defining two or more types of content in a plurality of areas of said image, respectively, comprising the steps of:

enlarging the image by a selected enlargement scaling factor by selecting the output image signal from the interpolator processor; and, reducing the image by a selected reduction scaling factor by selecting the output image signal from a preferred scaling processor wherein the preferred scaling processor comprises the interpolator processor for line drawing types of content, and the preferred scaling processor comprises the pixel window averaging processor for remaining types of content.

2. The method as defined in claim 1 further including a second interpolator processor wherein the second interpolator processor is used only for enlargement, and the remaining interpolator processor is used only for reduction.

3. The method as defined in claim 1 wherein anamorphic scaling including reduction in a first dimension and enlargement in a second dimension is implemented in a two-pass technique comprising a first pass of the image signal for reducing the image in a first direction to generate an intermediate signal, and a second pass of the intermediate signal for enlarging the image in a second direction.

4. The method as defined in claim 1 wherein anamorphic scaling including enlargement in a first dimension and reduction in a second dimension is implemented in a two-pass technique comprising a first pass of the image signal for enlarging the image in a first direction to generate an intermediate signal, and a second pass of the intermediate signal for reducing the image in a second direction.

5. An image scaling apparatus including:
   an interpolator processor serially connected to a first FIFO buffer;
   a window averaging processor in parallel with said interpolator processor and serially connected to a second FIFO buffer; and,
   a multiplexer with a first input connected to said first FIFO buffer and a second input connected to said second FIFO buffer, and with a select input connected to receive a selector bit;
   wherein said selector bit causes said multiplexer to accept input from said interpolator for enlarging operations and reducing operations for line drawing image types, and to accept input from said window averaging processor for remaining reducing operations.

6. The scaling apparatus as defined in claim 5 wherein anamorphic scaling including enlargement in a first dimension and reduction in a second dimension is implemented as a two-pass operation comprising a first pass of the image signal for reducing the image in a first direction to generate an intermediate signal, and a second pass of the intermediate signal for enlarging the image in a second direction.

7. The scaling apparatus as defined in claim 5 further including a second interpolator processor serially connected to the output of said multiplexer circuit wherein the second interpolator processor performs enlargement operations and the remaining interpolator processor performs reduction operations.

* * * * *